United States Patent
Srinivasan et al.

(10) Patent No.: US 7,797,082 B2
(45) Date of Patent: Sep. 14, 2010

(54) APPARATUS AND METHOD FOR STICTION COMPENSATION IN A PROCESS CONTROL SYSTEM

(75) Inventors: Ranganathan Srinivasan, Chennai (IN); Raghunathan Rengaswamy, Potsdam, NY (US)

(73) Assignee: Honeywell International Inc., Morristown, NJ (US)

( * ) Notice: Subject to any disclaimer, the term of this patent is extended or adjusted under 35 U.S.C. 154(b) by 634 days.

(21) Appl. No.: 11/542,463

(22) Filed: Oct. 3, 2006

(65) Prior Publication Data

US 2007/0088446 A1    Apr. 19, 2007

Related U.S. Application Data

(60) Provisional application No. 60/725,668, filed on Oct. 13, 2005.

(51) Int. Cl.
   *G05D 3/12* (2006.01)
   *G05D 7/00* (2006.01)
   *G05B 13/02* (2006.01)

(52) U.S. Cl. .................... 700/289; 700/32; 700/282
(58) Field of Classification Search ............. 700/32, 700/282, 289
   See application file for complete search history.

(56) References Cited

U.S. PATENT DOCUMENTS

| | | | |
|---|---|---|---|
| 5,374,884 A * | 12/1994 | Koren et al. | 318/632 |
| 5,721,477 A | 2/1998 | Sepehri et al. | |
| 6,094,602 A * | 7/2000 | Schade, III | 700/45 |
| 6,138,810 A * | 10/2000 | Fujii et al. | 192/85 R |
| 6,285,913 B1 * | 9/2001 | Hagglund | 700/45 |
| 6,286,532 B1 * | 9/2001 | van Nieuwstadt et al. | 137/1 |
| 6,517,029 B1 | 2/2003 | Holmes | |
| 6,745,084 B2 * | 6/2004 | Boger et al. | 700/13 |
| 7,274,995 B2 | 9/2007 | Zhan et al. | |
| 7,286,945 B2 | 10/2007 | Zhan et al. | |
| 2001/0037670 A1 * | 11/2001 | Boger et al. | 73/1.72 |
| 2002/0156541 A1 * | 10/2002 | Yutkowitz | 700/28 |
| 2004/0078168 A1 | 4/2004 | Horch | |
| 2004/0231641 A1 * | 11/2004 | Wind | 123/396 |
| 2007/0038333 A1 * | 2/2007 | Dadebo et al. | 700/270 |

(Continued)

OTHER PUBLICATIONS

Choudhury et al., A Simple Test to Confirm Control Valve Stiction, IFAC World Congress 2005, Jul. 4-8, praha.*

(Continued)

*Primary Examiner*—Albert DeCady
*Assistant Examiner*—Darrin Dunn
(74) *Attorney, Agent, or Firm*—Munck Carter, LLP

(57) ABSTRACT

An apparatus, method, and computer program for stiction compensation in a process control system are provided. A determination is made as to whether a valve is suffering from stiction. A control signal provided to the valve is adjusted in order to at least partially compensate for the stiction suffered by the valve. Adjusting the control signal could include (i) adjusting the control signal to cause the valve to move into a steady-state position and (ii) adjusting the control signal to cause the valve to remain in the steady-state position. Adjusting the control signal to cause the valve to move into the steady-state position could include (a) adjusting the control signal to cause the valve to move from a current position into a new position and (b) adjusting the control signal to cause the valve to move from the new position into the steady-state position.

21 Claims, 9 Drawing Sheets

U.S. PATENT DOCUMENTS

2007/0288103 A1* 12/2007 Choudhury et al. .......... 700/35

OTHER PUBLICATIONS

Yamashita, An Automatic Method for Detection of Valve Stiction in Process Control Loops, Control Eng. Practice 14 (2006) 503-510, available online May 5, 2005.*

Liyu Cao et al., Stick Slip Friction Compensation for PID Position Control, Proc. of the American Control Conf., Jun. 2000.*

Choudhury et al., A Data Driven Model for Valve Stiction, ADCHEM 2003, Jan. 11-14, 2004, Hong Kong.*

Horch, A Simple method for oscillation diagnosis in prcoess control loops, Proceedings of 1999 IEEE, Aug. 22, 1999.*

Choudhury et al., Automatic detection and quantification of stiction in control vales, Control Engineering Practice (2006) 1395-1412.*

Choudhury et al., Modelling Valve Stiction, Control Engineeg Practice, 2004.*

Hagglund, A friction compensator for pneumatic control valves, Jounral of Process Control 12 (2002) 897-904.*

Miller et al., Control Loop Performance Assessment 2. Hammerstein Model Approach for Stiction Diagnosis, Ind. Eng. Res., Jul. 12, 2005.*

Miller et al., Control Loop Performance Assessment 1. A Qualitative Approach for Stiction Diagnosis, Ind. Chem. Res, Jul. 12, 2005.*

Ranganathan Srinivasan et al., "Control Loop Performance Assessment. 1. A Qualitative Approach for Stiction Diagnosis," Ind. Eng. Chem. Res., vol. 44, No. 17, 2005, pp. 6708-6718.

Ranganathan Srinivasan et al., "Control Loop Performance Assessment. 2. Hammerstein Model Approach for Stiction Diagnosis," Ind. Eng. Chem. Res., vol. 44, No. 17, 2005, pp. 6719-6728.

H. Olsson et al., Friction Models and Friction Compensation, European Journal of Control, vol. 4, Dec. 1998, pp. 176-195.

Tore Hagglund, A Friction Compensator for Pneumatic Control Valves, Journal of Process Control, vol. 12, No. 8, Dec. 2002, pp. 897-904.

Ranganathan Srinivasan et al., "Control Loop Performance Assessment. 1. A Qualitative Approach for Stiction Diagnosis," Ind. Eng. Chem. Res., vol. 44, No. 17, 2005, pp. 6708-6718.

Ranganathan Srinivasan et al., "Control Loop Performance Assessment. 2. Hammerstein Model Approach for Stiction Diagnosis," Ind. Eng. Chem. Res., vol. 44, No. 17, 2005, pp. 6719-6728.

* cited by examiner

APPARATUS AND METHOD FOR STICTION COMPENSATION IN A PROCESS CONTROL SYSTEM

CROSS-REFERENCE TO RELATED APPLICATIONS

This application claims priority under 35 U.S.C. §119(e) to U.S. Provisional Patent Application No. 60/725,668 filed on Oct. 13, 2005, which is hereby incorporated by reference.

TECHNICAL FIELD

This disclosure relates generally to control systems and more specifically to an apparatus and method for stiction compensation in a process control system.

BACKGROUND

Processing facilities are typically managed using process control systems. Among other functions, these control systems often manage the use of valves in the processing facilities. The valves typically control the flow of materials in the facilities. Example processing facilities include manufacturing plants, chemical plants, crude oil refineries, and ore processing plants. In these facilities, the valves may control the flow of water, oil, hydrochloric acid, or any other or additional materials in the facilities.

The valves used in the processing facilities often suffer from a number of problems or defects. For example, a valve may suffer from valve "stiction." Valve stiction, which is short for static friction, refers to the valve's resistance to the start of motion. It occurs when the valve fails to respond to pressure meant to adjust the opening of the valve. The valve fails to respond until additional pressure is added, which then causes the valve to open or close more than desired. This process is then repeated, generally causing an oscillation in the valve. This often limits or prevents the control systems from accurately controlling the flow of materials using the valve. It also often wastes energy and causes excessive wear on the valves.

SUMMARY

This disclosure provides an apparatus and method for stiction compensation in a process control system.

In a first embodiment, an apparatus includes at least one memory operable to store operating data associated with a valve. The apparatus also includes at least one processor operable to identify whether the valve is suffering from stiction using at least part of the operating data. The at least one processor is also operable to adjust a control signal provided to the valve in order to at least partially compensate for the stiction suffered by the valve.

In particular embodiments, the at least one processor is operable to adjust the control signal by (i) adjusting the control signal to cause the valve to move into a steady-state position and (ii) adjusting the control signal to cause the valve to remain in the steady-state position.

In other particular embodiments, the at least one processor is operable to adjust the control signal to cause the valve to move into the steady-state position by (a) adjusting the control signal to cause the valve to move from a current position into a new position and (b) adjusting the control signal to cause the valve to move from the new position into the steady-state position.

In a second embodiment, a method includes identifying whether a valve is suffering from stiction. The method also includes adjusting a control signal provided to the valve in order to at least partially compensate for the stiction suffered by the valve.

In a third embodiment, a computer program is embodied on a computer readable medium and is operable to be executed by a processor. The computer program includes computer readable program code for identifying whether a valve is suffering from stiction. The computer program also includes computer readable program code for adjusting a control signal provided to the valve in order to at least partially compensate for the stiction suffered by the valve.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
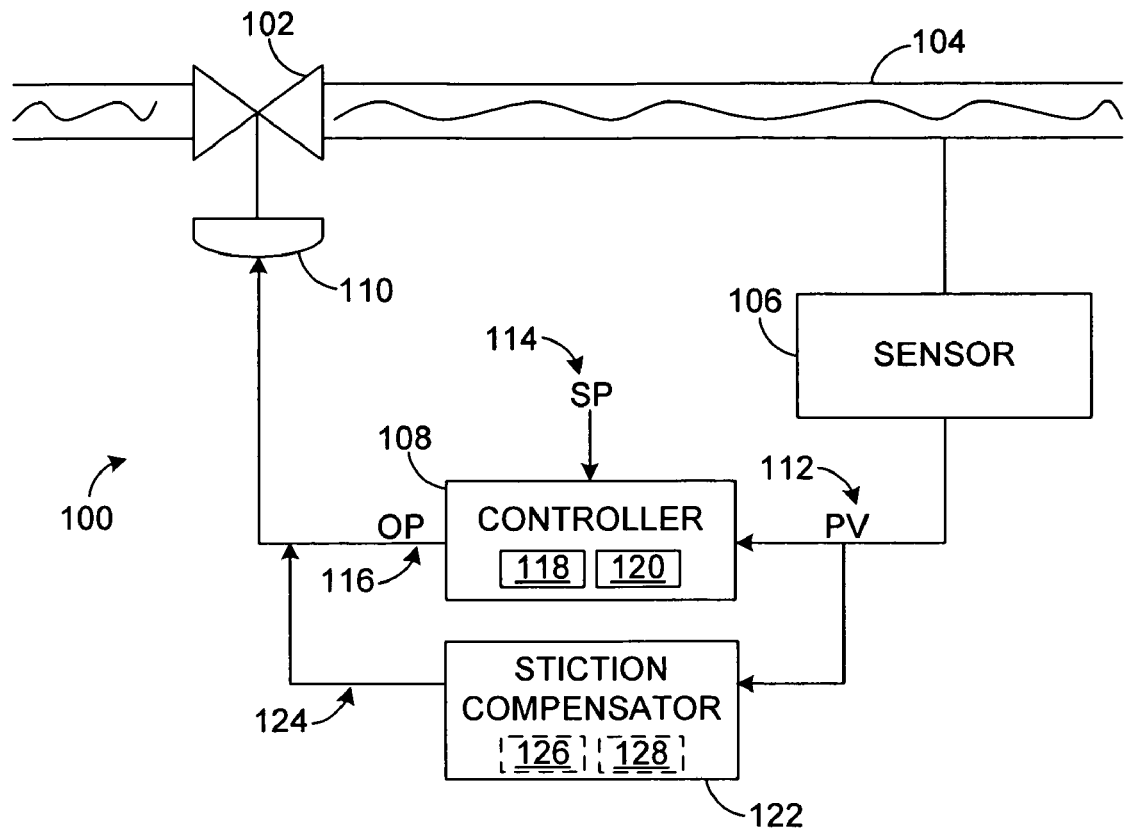
FIG. 1 illustrates an example process control system including a valve.

FIG. 1 illustrates an example process control system 100 including a valve 102. The process control system 100 shown in FIG. 1 is for illustration only. Other systems may be used without departing from the scope of this disclosure.

In the illustrated example, one or more materials flow through a pipe 104, and the flow of materials through the pipe 104 is controlled by the valve 102. The pipe 104 represents any suitable structure capable of facilitating the transport of one or more materials. The pipe 104 could, for example, represent a steel or plastic pipe or tube capable of facilitating the transport of oil, water, hydrochloric acid, or any other material or materials.

Figure 2:
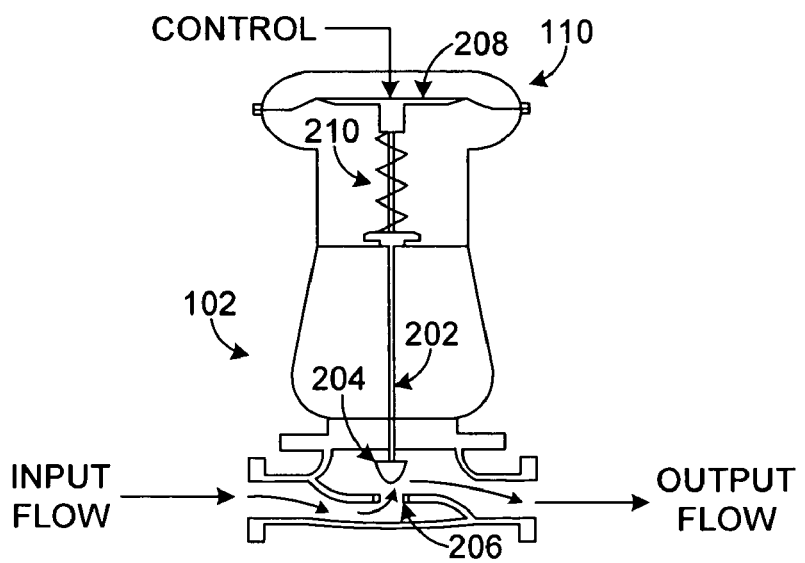
FIG. 2 illustrates an example valve in a process control system.

The valve 102 controls the rate at which the material or materials flow through the pipe 104. The valve 102 may, for example, change an opening in the pipe 104, where a larger valve opening allows more material to flow through the pipe 104. The valve 102 includes any structure capable of controlling the flow of one or more materials through a pipe 104 or other structure. For example, the valve 102 may include a stem capable of moving a plug to change the size of an opening. One example embodiment of a valve 102 is shown in FIG. 2, which is described below.

In the illustrated example, the process control system 100 also includes a sensor 106, a controller 108, and a valve actuator/positioner 110. The sensor 106 monitors one or more characteristics associated with the process control system 100. For example, the sensor 106 may measure the flow rate of a material flowing through the pipe 104. The sensor 106 could monitor any other or additional characteristics of the material flowing through the pipe 104 or of the process control system 100, such as pressure or temperature. The sensor 106 also transmits or outputs a signal 112 to the controller 108, where the signal 112 includes values identifying the measurements made by the sensor 106. The flow rate or other monitored characteristic may be referred to as a process variable, and the signal 112 provided to the controller 108 may be referred to as a process variable (PV) signal. The sensor 106 includes any hardware, software, firmware, or combination thereof capable of measuring at least one characteristic of the process control system 100.

The controller 108 controls the opening and the closing of the valve 102 in the system 100. In this example embodiment, the controller 108 uses the process variable signal 112 provided by the sensor 106 and a setpoint (SP) signal 114 to control the valve 102. The setpoint signal 114 identifies the desired value for the process variable signal 112, and the setpoint signal 114 may or may not vary over time. As a particular example, the controller 108 may adjust the valve opening so that the flow rate of material through the pipe 104 remains at or near a level indicated by the setpoint signal 114. Using the process variable signal 112 and the setpoint signal 114, the controller 108 generates and transmits an output signal (OP) 116. The output signal 116 controls the opening and closing of the valve 102. Ideally, the output signal 116 controls the valve 102 so that the process variable signal 112 remains at or near the setpoint signal 114. The controller 108 includes any hardware, software, firmware, or combination thereof for controlling the operation of the valve 102. As a particular example, the controller 108 could include at least one processor 118 and at least one memory 120 capable of storing data and instructions (such as one or more software routines) executed by the at least one processor 118.

The valve actuator/positioner 110 opens and closes the valve 102 based on the output signal 116. In general, an actuator may represent a diaphragm or other structure that physically causes the stem of the valve 102 to move (thereby moving the plug of the valve 102), while a positioner controls the valve stem so that it corresponds to the output signal 116. Valves 102 often include actuators and may or may not include positioners. The valve actuator/positioner 110 includes any structure(s) capable of opening and/or closing a valve 102.

In one aspect of operation, the process control system 100 includes a stiction compensator 122. The stiction compensator 122 helps to compensate for stiction in the valve 102. Stiction occurs when the valve 102 fails to respond to pressure from the valve actuator/positioner 110 until additional pressure is applied to the valve 102. At that point, the valve 102 jumps to a larger or smaller opening than desired, and the process is then repeated. Stiction typically causes persistent oscillations in the position of the valve 102, meaning the actual position of the valve 102 typically swings back and forth around a desired or steady-state position (defined by setpoint signal 114).

The stiction compensator 122 helps to reduce the effects of valve stiction in the process control system 100. For example, the stiction compensator 122 may generate a compensation signal 124, which compensates the output signal 116 generated by the controller 108 to help force the valve 102 into a steady-state position. Once the valve's steady-state position is reached, the stiction compensator 122 may compensate the output signal 116 (via the compensation signal 124) to keep the controller 108 from moving the valve 102 away from its steady-state position. In this way, the stiction compensator 122 may help to reduce or prevent valve stiction from significantly affecting the overall operation of the process control system 100.

The stiction compensator 122 may include any hardware, software, firmware, or combination thereof for at least partially compensating for stiction in one or more valves 102. For example, the stiction compensator 122 could include at least one processor 126 and at least one memory 128 capable of storing data and instructions (such as one or more software routines) executed by the at least one processor 126. As particular examples, the stiction compensator 122 could represent an application or other logic executed by a stand-alone unit or another component in the process control system 100 (such as the controller 108). The stiction compensator 122 could also represent a hardware or other module implemented in a stand-alone unit or another component in the process control system 100. The stiction compensator 122 could be implemented in any other suitable manner.

FIG. 2 illustrates an example valve 102 in a process control system. The embodiment of the valve 102 shown in FIG. 2 is for illustration only. Other embodiments of the valve may be used in the process control system 100 without departing from the scope of this disclosure.

As shown in this example, the valve 102 generally includes a stem 202 and a plug 204. The stem 202 can be moved up and down to move the plug 204, which changes the amount of material flowing through an opening 206 in the valve 102. The valve actuator/positioner 110 generally includes a plate 208 and a spring 210. A control signal (such as a pneumatic air signal or other output signal 116) can be increased to push down against the plate 208, which pushes the plug 204 towards the opening 206. The control signal can also be decreased to allow the spring 210 to push up against the plate 208, which pulls the plug 204 away from the opening 206. In this way, the amount of material flowing through the valve 102 can be controlled.

Stiction may cause the plug 204 to move more than desired when the valve 102 is being adjusted. Stiction can occur for a wide range of reasons, including seal degradation, lubricant depletion, foreign matter intrusion, activation at metal sliding surfaces at high temperatures, and packing around the stem 202 in the valve 102. Stiction often varies over time and can lead to non-uniform wear of the valve 102.

When the controller 108 attempts to adjust the valve 102 so that the process variable signal 112 is at or near the setpoint signal 114, stiction often causes persistent oscillations in the position of the valve 102. For example, the controller 108 may attempt to slow the flow of material through the valve 102, so the controller 108 begins increasing the value of the output signal 116. However, static frictional forces prevent the valve 102 from moving, so the controller 108 continues to increase the value of the output signal 116. At some point, the static frictional forces in the valve 102 are overcome, but the excessive output signal 116 causes the valve 102 to close more than desired. The controller 108 then begins attempting to move the valve 102 in the opposite direction. A similar process can then occur, where stiction causes the valve 102 to open more than desired.

Figure 3:
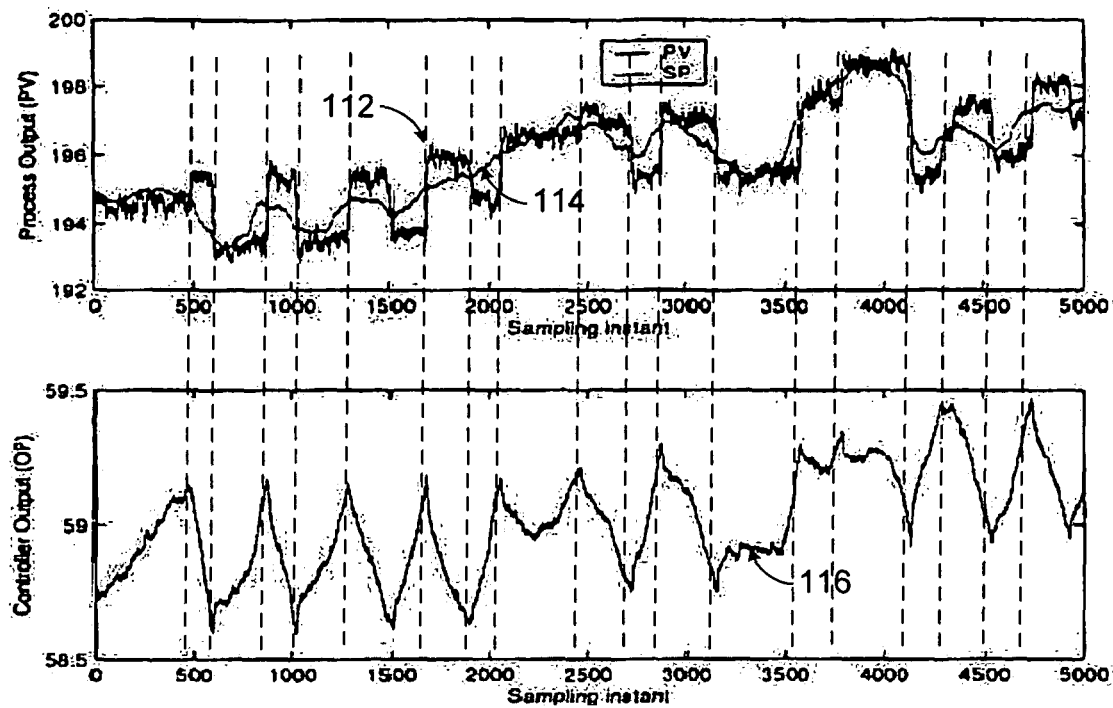
FIG. 3 illustrates example fluctuations associated with a valve suffering from stiction in a process control system.

This behavior is shown in FIG. 3, which illustrates example fluctuations associated with a valve 102 suffering from stiction in a process control system. In FIG. 3, the process variable signal 112, the setpoint signal 114, and the output signal 116 are charted over time. As shown here, the process variable signal 112 generally oscillates between time periods with higher values and time periods with lower values. This indicates that the position of the valve 102 is oscillating around its steady-state position (as defined by the setpoint signal 114 used by the controller 108).

Also, as shown in FIG. 3, the output signal 116 generally decreases during the time periods when the process variable signal 112 is higher and generally increases during the time periods when the process variable signal 112 is lower. This indicates that an increase or decrease in the output signal 116 is typically followed by an excessive movement of the valve 102, causing a jump in the process variable signal 112. This results in oscillations in the process variable signal 112.

These oscillations often lead to increased energy consumption, wastage of materials, and less uniform end products. Reducing or eliminating these oscillations could yield significant commercial or economic benefits, particularly given the large number of valves in the process industry (currently three million or more). Even a one percent reduction in energy consumption in the process industry could result in significant savings (such as $300 million or more per year). Also, compensating for stiction, as opposed to identifying stiction and performing valve maintenance, could reduce the cost of maintaining the valves, where valve maintenance could cost $400-$2,000 or more per valve.

In general, the stiction compensator 122 may compensate or adjust the output signal 116 provided by the controller 108 to help reduce the effects of stiction in the valve 102. In the absence of any setpoint changes, this may help to force the valve 102 into a steady-state position more quickly and remain in that steady-state position. The time required to reach the steady-state position may depend on the dynamics of the particular system and the design of the stiction compensator 122. To compensate or adjust the output signal 116 provided by the controller 108, the stiction compensator 122 may function to push the stem 202/plug 204 of the valve 102 to its steady-state position in a desired amount of time, such as a specified number of time blocks or steps. Once at the steady-state position, the stiction compensator 122 may function to prevent the stem 202/plug 204 of the valve 102 from moving away from this steady-state position, allowing the valve position to remain undisturbed.

The following describes one particular implementation of the stiction compensator 122 for compensating for stiction in a valve 102. This description of the stiction compensator 122 is for illustration and explanation only. Other embodiments of the stiction compensator 122 could be used without departing from the scope of this disclosure.

Figure 4:
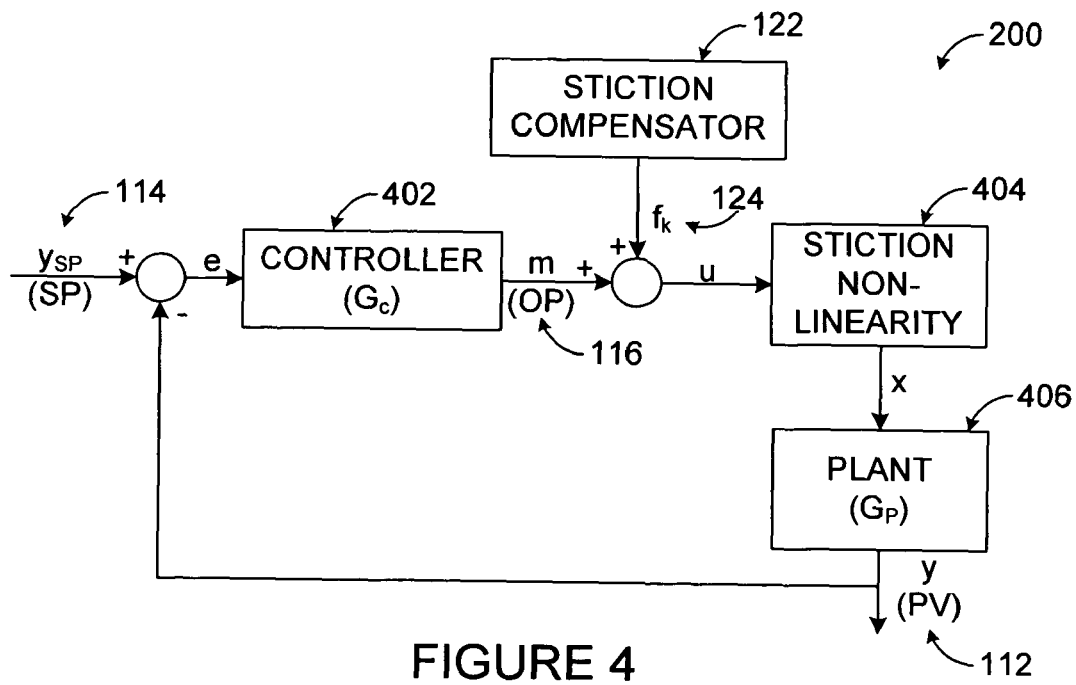
FIG. 4 illustrates an example model of a process control system.

In discussing the operation of the stiction compensator 122, the process control system 100 shown in FIG. 1 (or any other process system) could be represented as shown in FIG. 4. In this example, the process variable signal (y) 112 is subtracted from the setpoint signal ($y_{SP}$) 114 to produce an error signal e. The error signal e is used by a controller model ($G_C$) 402 to generate the output signal (m) 116. The stiction compensator 122 produces a compensation signal ($f_k$) 124, which adjusts the output signal 116 to produce a control signal u. The control signal u is provided to the valve 102.

The valve 102 is represented, in part, by a stiction non-linearity 404. Stiction causes the valve 102 to have a non-linear response to the signal u, and that non-linear response is represented by the non-linearity 404. Here, x represents the expected or predicted position of the stem 202/plug 204 in the valve 102. Also, a process model or plant ($G_P$) 406 represents the linear behavior of the process system 100 (including the valve 102). This means that the plant 406 represents the valve dynamics after the start of stem/plug movement in the valve 102 (when the valve position responds linearly to the output signal 116), and the behavior caused by stiction is represented by the non-linearity 404. The output of the plant 406 represents the process variable signal 112.

Figure 5:
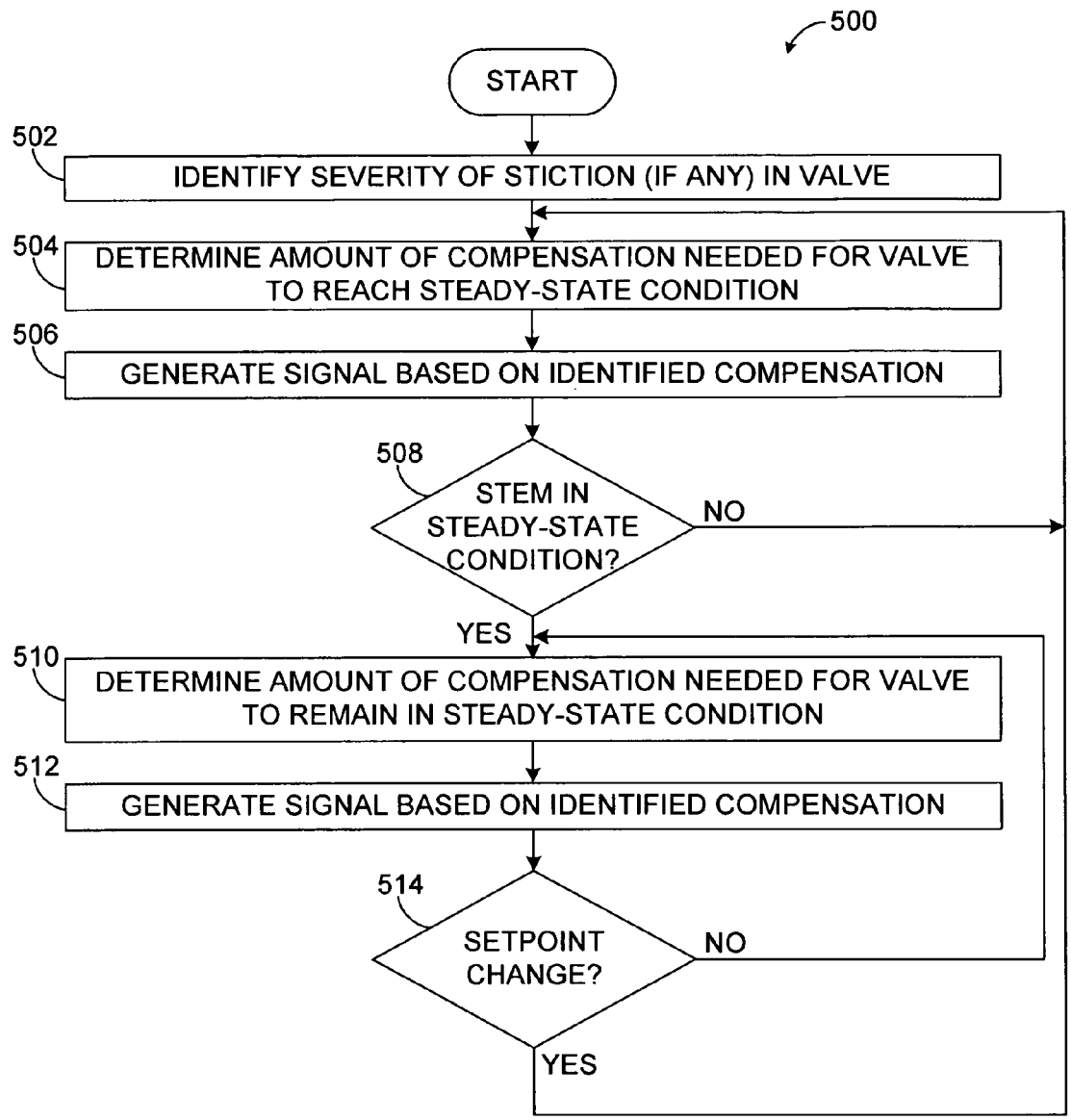
FIG. 5 illustrates an example method for stiction compensation in a process control system.

Using this model as a reference, some embodiments of the stiction compensator 122 may operate as shown in FIG. 5, which illustrates an example method 500 for stiction compensation in a process control system. As shown in FIG. 5, the stiction compensator 122 may identify a severity of any stiction in a valve 102 at step 502. In particular embodiments, the stiction compensator 122 may identify two stiction severity measures using different techniques. One stiction severity measure may be qualitative, and the other stiction severity measure may be quantitative.

Figure 9:
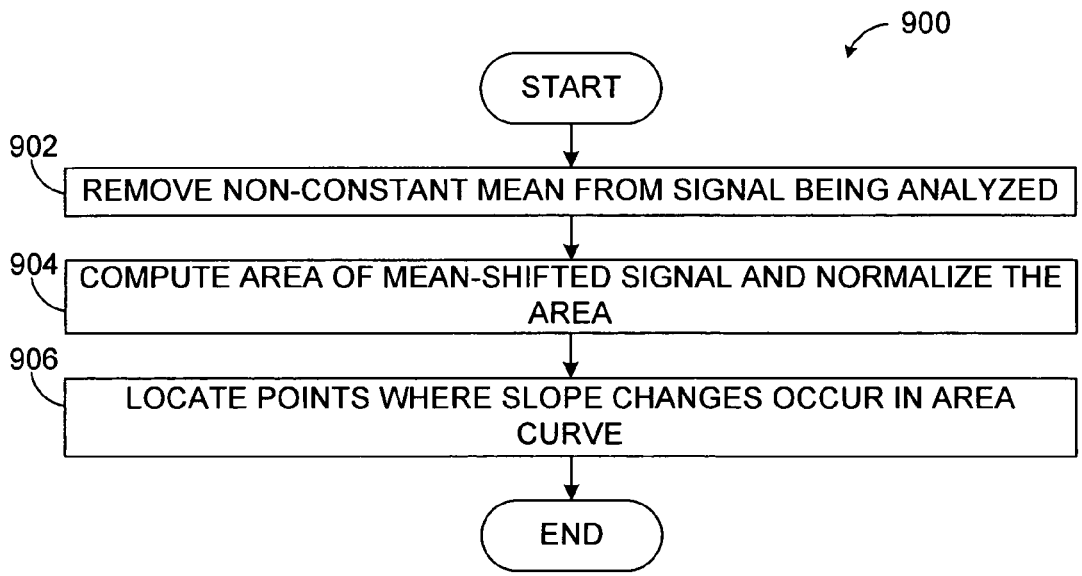
FIGS. 9 through 10B illustrate an example technique for qualitatively determining an amount of stiction in a valve.

For the qualitative stiction severity measure, a qualitative pattern recognition approach can be used for stiction diagnosis. As shown in FIG. 3, stiction can create very distinctive shapes or patterns in the output signal 116, process variable signal 112, and other signals. Example shapes include square/rectangular, triangular, and saw-toothed shapes, depending on the type of controller 108 used. In contrast, stiction-free valves 102 often exhibit more sinusoidal oscillations in the output signal 116 and the process variable signal 112. Pattern recognition can be used to identify differences in shape and determine if, and to what extent, stiction is present in a valve 102. Additional details regarding this approach are shown in FIGS. 9 through 10B, which are described below.

For the quantitative stiction severity measure, a Hammerstein model identification procedure can be used to estimate the stiction parameter in the following stiction model:

$$x_t = \begin{cases} x_{t-1} & \text{if } |u_t - x_{t-1}| \leq d \\ u_t & \text{otherwise} \end{cases} \quad (1)$$

Figure 11A:
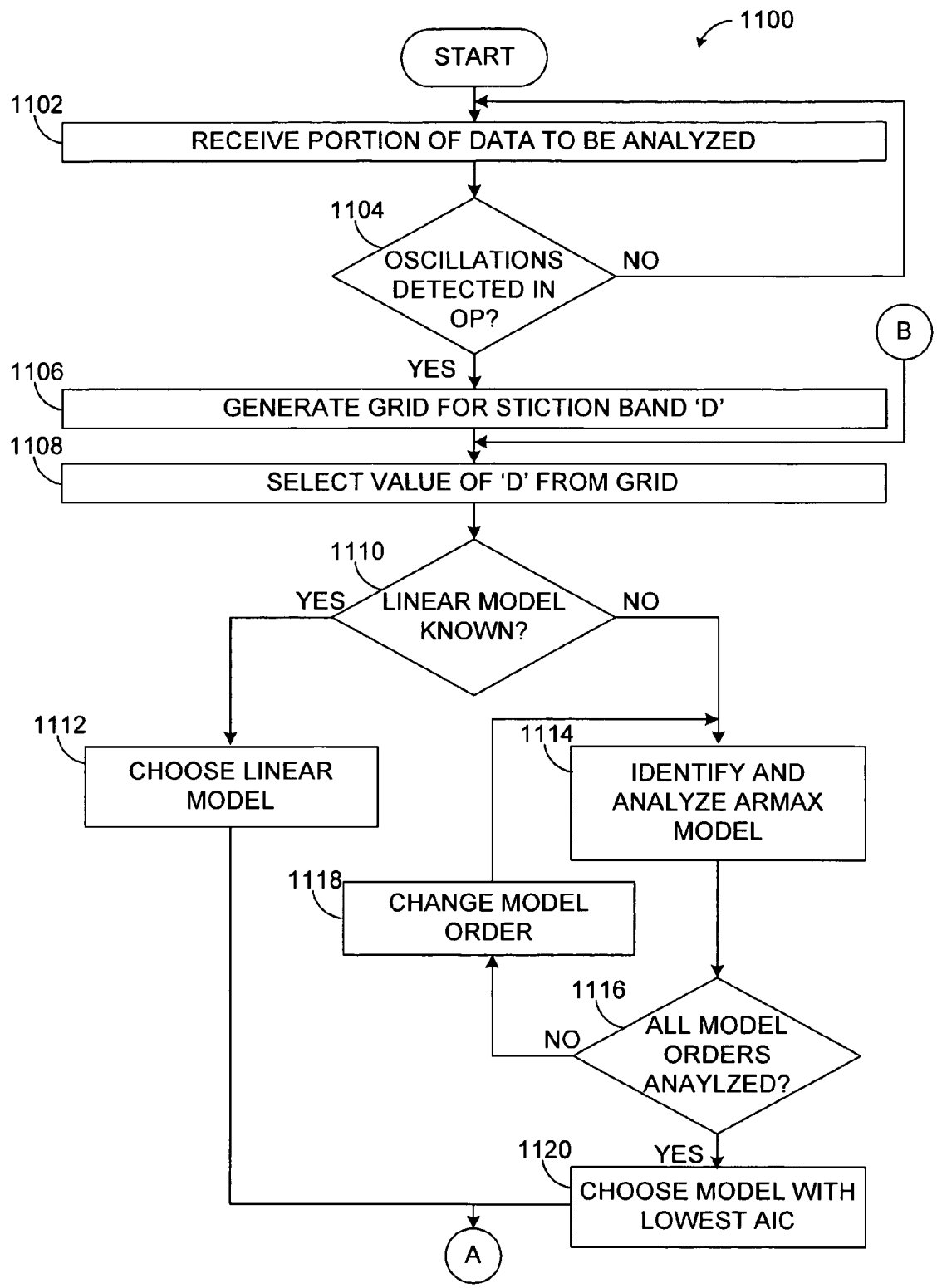
FIGS. 11A and 11B illustrate an example technique for quantitatively determining an amount of stiction in a valve.
Figure 11B:
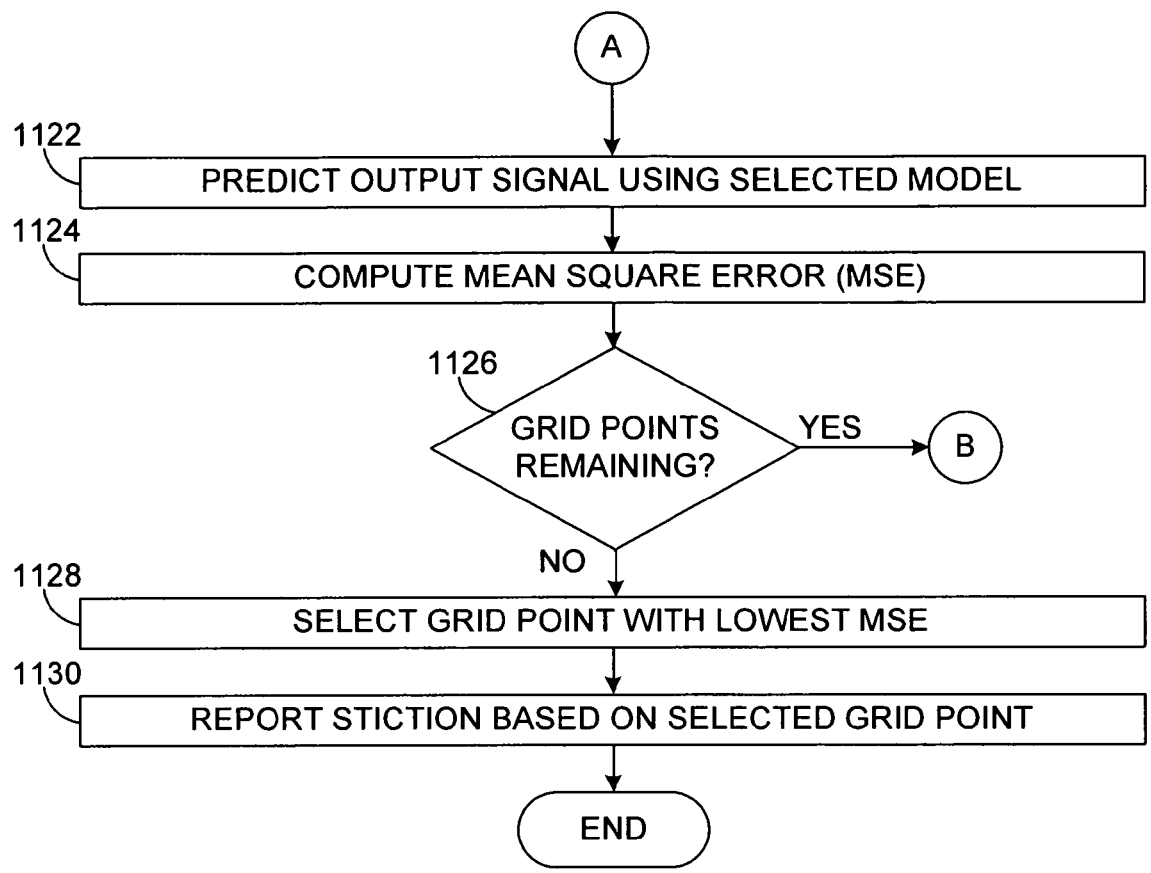

Here, $x_t$ and $x_{t-1}$ represent the present and past movements of the stem 202/plug 204 in the valve 102, $u_t$ represents the present output of the controller 108, and d represents a valve stiction band or threshold. The Hammerstein model is shown in FIG. 4, where the non-linearity 404 of the valve 102 caused by stiction is represented separately from the plant 406, which includes the linear behavior of the valve 102. Additional details regarding this approach are shown in FIGS. 11A and 11B, which are described below.

Assuming stiction is present, the stiction compensator 122 then determines an amount of compensation necessary to move the valve 102 from its current position to a steady-state position at step 504. The stiction compensator 122 also generates and provides one or more compensation signals ($f_k$) 124 to provide the necessary compensation at step 506. The stiction compensator 122 determines whether the valve 102 has reached its steady-state position at step 508 and, if not, repeats steps 504-506.

In some embodiments, the stiction compensator 122 may perform these steps as follows. Assume $y_t$, $e_t$, $m_t$, and $x_t$ represent the current values of the process variable signal 112, the error e, the output signal 116, and the stem/plug position of the valve 102. From Equation (1), in the absence of compensation ($f_k$=0), the following may be true:

$$u_t = m_t \text{ and } |u_t - x_{ss}| \leq d \quad (2)$$

where $x_{ss}$ represents the steady-state position of the valve 102. The addition of the compensation signal 124 at a current time t may not move the valve 102 from its current position $x_t$ to the steady-state position $x_{ss}$ in a single move, and more than one move may be designed to move the valve 102 from its current position $x_t$ to the steady-state position $x_{ss}$.

In particular embodiments, the stiction compensator 122 may design a set of compensating valve moves that push the stem 202/plug 204 of the valve 102 to or near its steady-state position. Let $(f_k)_t$ represent the compensation signal 124 that is added to the output signal $(m_t)$ 116 at time t. As shown in Equation (1), an amplitude change that is equal to or greater than d from its past value $u_{t-1}$ causes the stem 202/plug 204 of the valve 102 to move from its present position to a new position. The first compensating move of the valve 102 could therefore be designed as $(f_k)_t = |m_t| + d$, such that $u_t = m_t \pm (f_k)_t$. Both the addition and subtraction of $(f_k)_t$ from $m_t$ can cause the valve position to move such that $|x_t| > d$. The determination of whether to perform an addition or subtraction may depend on several factors, such as the proximity of the current valve operating point to its allowable or saturation limits.

At this point (current time t), $|x_t| > d$. The next compensating move can be designed to move the valve 102 into its steady-state position. Using models of the process and the controller, the next output of the controller 108 can be predicted by the stiction compensator 122. For example, the following could be used to predict the controller output:

$$(y_{pred})_{t+1} = G_p x_t \quad (3)$$

$$e_{t+1} = -(y_{pred})_{t+1} \quad (4)$$

$$m_{t+1} G_c e_t \quad (5)$$

Here, $(y_{pred})_{t+1}$ represents the predicted controller output at time t+1. For the valve 102 to move into its steady-state position, the following may be used:

$$x_{t+1} = 0 \rightarrow u_{t+1} = 0 \quad (6)$$

$$u_{t+1} = 0 \rightarrow m_{t+1} + (f_k)_{t+1} = 0 \quad (7)$$

$$(f_k)_{t+1} = -m_{t+1}. \quad (8)$$

To summarize, two compensating moves $(f_k)_t$ and $(f_k)_{t+1}$ can be made by the stiction compensator 122 to move the valve 102 into its steady-state position, and provide stiction compensation:

$$(f_k)_t = |m_t| + d \text{ and } u_t = m_t \pm (f_k)_t \quad (9)$$

$$(f_k)_{t+1} = -m_{t+1} \quad (10)$$

As shown in Equation (10), the second compensating move may not be dependent on the first move. Also, since the first compensating move in Equation (9) can involve either adding or subtracting a value from the output signal 116, there are at least two ways to design the first compensating move. Since controllers often have an operating range normalized between 0% and 100%, the first compensating move may be designed so that the first move is in the range 0% to 100% (the valve 102 is not pushed either fully opened or fully closed). Further, while shown here as involving two compensating moves, the movement of the valve 102 into its steady-state position could involve any number of compensating moves. Using more than two compensating moves may not be optimum with respect to the number of times that the valve 102 is moved, but it may help the process variable signal 112 reach its setpoint signal 114 more quickly.

In addition, the first compensating move could involve any signal that moves the valve 102 from its stuck position. Therefore, a set of possible first compensating moves could be represented as $(f_k)_t = |m_t| + \alpha d$, where $\alpha$ represents a real value greater than one. This implies that there may be several ways to design the first compensating move, as long as the move does not cause the valve 102 to saturate. A high magnitude compensation signal 124 could possibly be used to bring the process variable signal 112 to the setpoint signal 114 relatively quickly.

Returning to FIG. 5, after the valve 102 reaches its steady-state position, the stiction compensator 122 takes steps to help maintain the valve 102 in its steady-state position. The stiction compensator 122 determines the amount of compensation necessary to maintain the valve 102 in its steady-state position at step 510. The stiction compensator 122 generates and provides one or more compensation signals $(f_k)$ 124 to provide the necessary compensation at step 512. If no setpoint change is detected at step 514, the stiction compensator 122 may continue to repeat steps 510-512 to maintain the valve 102 in its steady-state position. Otherwise, the stiction compensator 122 may return to step 504 to help move the valve 102 into a new steady-state position associated with a new value of the setpoint signal 114.

In particular embodiments, the stiction compensator 122 may perform these steps as follows. The compensation signal 124 can be designed to satisfy the following condition:

$$|m_t + (f_k)_t| < d \quad (11)$$

for all t. Under this condition, the stem 202/plug 204 of the valve 102 may be maintained in its steady-state position, and the process variable signal 112 may reach and maintain the setpoint signal 114. Also, the compensation signal 124 could be designed so as to be constantly bounded with a value as specified below:

$$|(f_k)_t| < d + A \quad (12)$$

where A represents the amplitude of the limit cycle at the controller output m.

Note that the above description of FIG. 5 has contained specific examples of calculations, equations, and assumptions. This has been for illustration and explanation only. Other embodiments of the stiction compensator 122 could be used that operate in any other suitable manner.

Figure 6:
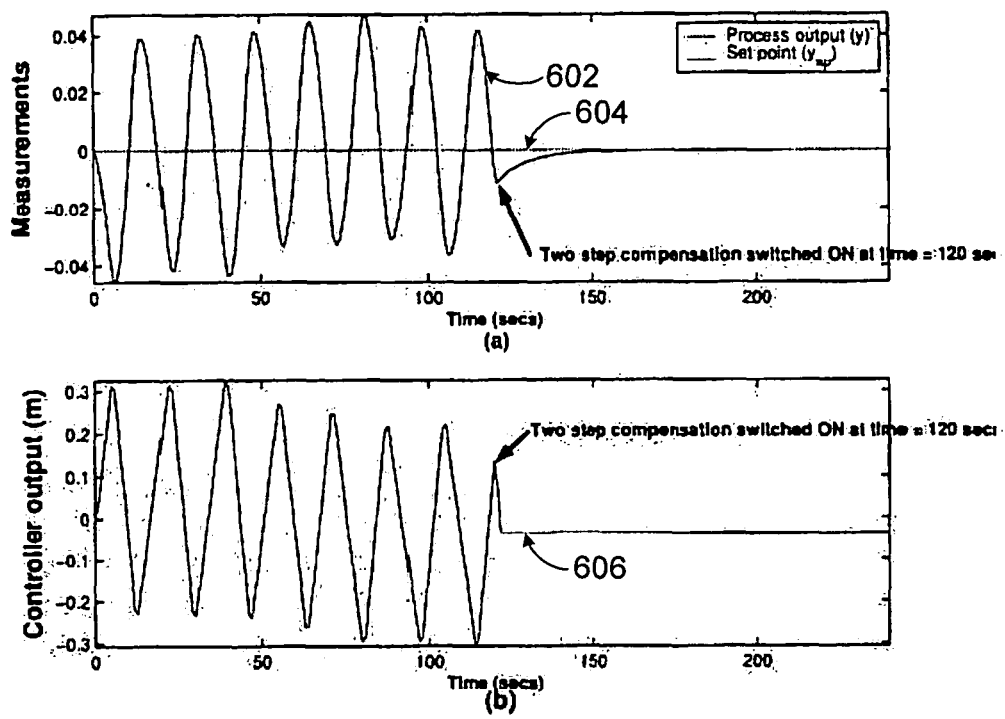
FIGS. 6 through 8 illustrate example stiction compensation in a process control system.
Figure 7:
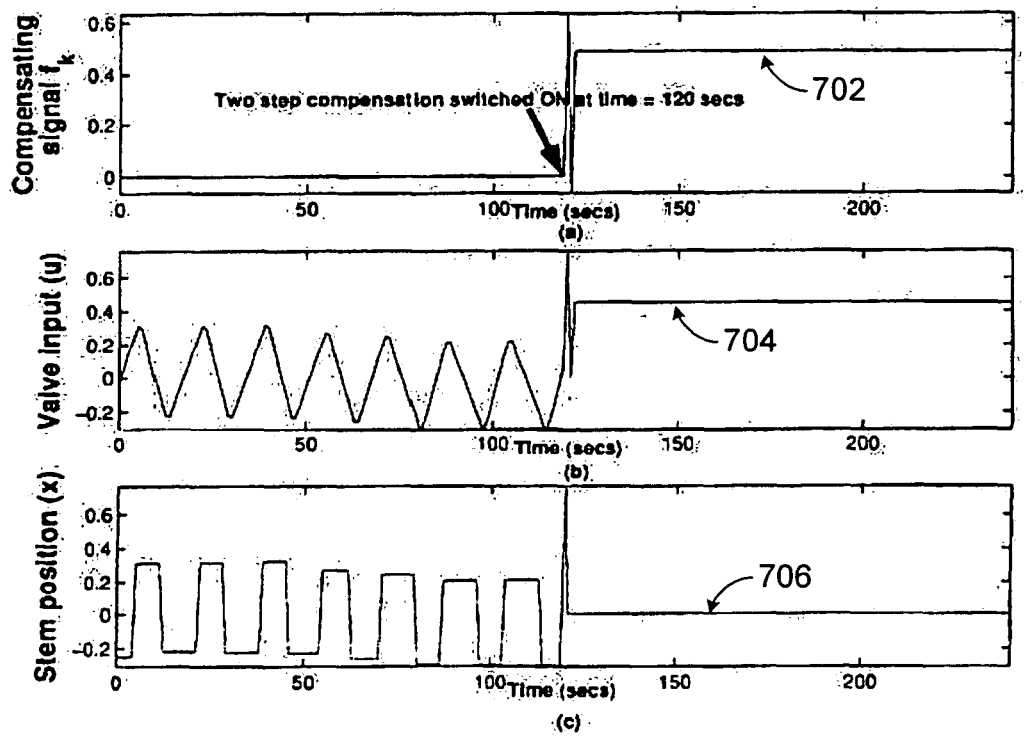
Figure 8:
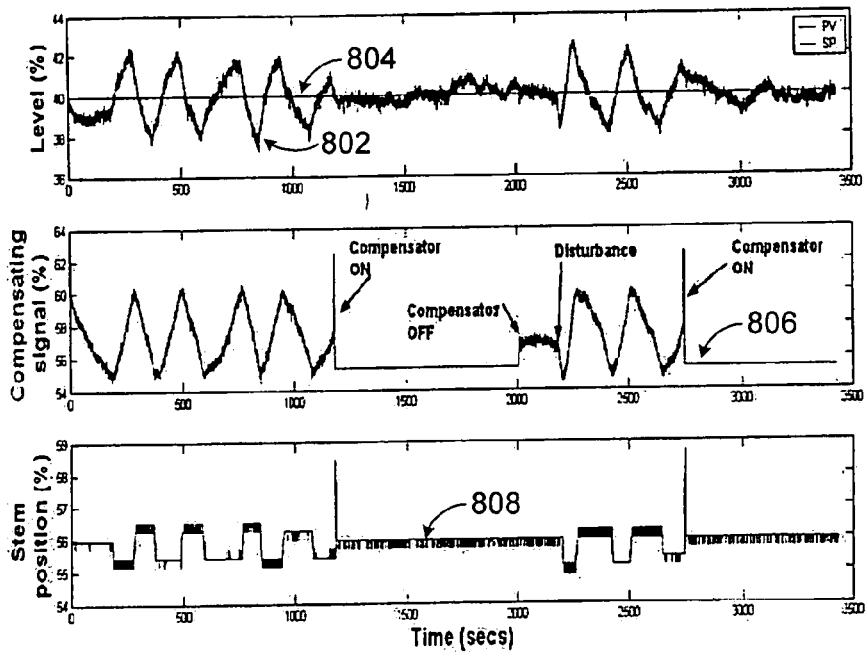

Using the technique described above with respect to FIG. 5, example operations of the stiction compensator 122 are shown in FIGS. 6 through 8. With respect to FIGS. 6 and 7, consider a closed-loop process where:

$$G_p(z) = \frac{0.0091 z^{-1} + 0.0082 z^{-2}}{1 - 1.724 z^{-1} + 0.748 z^{-1}} \quad (13)$$

$$G_c(z) = \frac{16 - 27.53 z^{-1} + 11.81 z^{-2}}{1 - z^{-1}}. \quad (14)$$

Assume the system is sampled once per second, and the loop oscillates due to stiction simulated using Equation (1) with d=0.5. A two-step compensation (as described above with respect to steps 504-506 of FIG. 5) is activated at time t=120 seconds.

As shown in FIG. 6, line 602 represents the process variable signal 112, line 604 represents the setpoint signal 114, and line 606 represents the output signal 116. In this simulation, the process variable signal 112 is oscillating due to stiction. Upon activation of the two-step compensation, the oscillations reduce or stop, and the valve 102 reaches its steady-state position. This is also shown in FIG. 7, where line 702 represents the compensation signal 124, line 704 represents the control signal u provided to the valve 102 (the sum of output signal 116 and compensation signal 124), and line 706 represents the position of the stem 202/plug 204 in the valve 102. It appears here that the use of process or controller models may not be required, allowing this approach to be used in a wide variety of industrial settings.

FIG. 8 illustrates experimental results obtained using the above-described technique. A water-flow system includes a linear needle plug valve assembly. The control valve represents a pneumatic air valve, and the actuator is configured "Air to Close" with a fail safe setting as "Open Fully." No valve positioner is used. The control valve initially shows negligible stiction (<0.2%). Stiction of about 5% of the controller span (0% to 100%) is introduced by tightening the stem packing, which commonly occurs in industrial settings. A linear variable differential transformer (LVDT) is used to measure stem position of the valve. The results are shown in FIG. 8, where line 802 represents the process variable signal 112, line 804 represents the setpoint signal 114, line 806 represents the compensation signal 124, and line 808 represents the stem position in the valve.

In this example, the process variable signal 112 is oscillating due to stiction until activation of the stiction compensator 122 at time t=1200 seconds. The oscillations are then reduced or eliminated and the stem moves to its steady-state position with two compensating moves. After the process variable signal 112 steadies at or near its setpoint, the stiction compensator 122 is switched off at time t=2000 seconds. Between times t=1200 and t=2000, the stiction compensator 122 prevents the valve from moving away from its steady-state position. After time t=2000, a disturbance causes the valve to move away from its setpoint, and the oscillations caused by stiction reappear. This activates the stiction compensator 122 at time t=2750 seconds, which again eliminates the oscillations and brings the valve to its steady-state position.

As shown in these examples, the stiction compensator 122 may be effective in (i) moving a valve 102 to its steady-state position relatively quickly and (ii) maintaining the valve 102 at its steady-state position. The examples shown in FIGS. 6 through 8 are provided merely to illustrate example operations of the stiction compensator 122. The stiction compensator 122 may operate in any other or additional manner to move a valve 102 to its steady-state position and/or to maintain the valve 102 at its steady-state position.

Although FIGS. 1 through 8 illustrate various embodiments and operations of a process control system 100 and a stiction compensator 122, various changes may be made to FIGS. 1 through 8. For example, the process control system 100 could include any number of valves 102, pipes 104, controllers 108, and stiction compensators 122. Also, the stiction compensator 122 could be used in any other suitable system and could be used with any number of controllers 108 and/or valves 102. Further, while shown as a series of steps, various steps in the method 500 of FIG. 5 could overlap or occur in parallel.

FIGS. 9 through 10B illustrate an example technique for qualitatively determining an amount of stiction in a valve 102. This may be useful, for example, during step 502 of FIG. 5. As noted above, to determine a qualitative stiction severity measure, a qualitative pattern recognition approach can be used to identify the patterns (such as square/rectangular, triangular, or saw-toothed) that routinely occur when stiction is present.

Stiction often leads to the creation of clearly distinguishable patterns in various signals (such as process variable signal 112 and output signal 116). However, automatically recognizing and characterizing these patterns is often difficult due to many factors, including the fact that stiction patterns are often asymmetric, non-linear, and time varying in both frequency and magnitude.

A technique for qualitatively determining an amount of stiction in a valve 102 may involve accurately characterizing the oscillations in a signal. Many current techniques lack or fail to provide time localization of the oscillations, or characterizations of the start times of the oscillations and their consecutive zero-crossings. With available information often limited to routine operating data (signals 112-116), controller settings (such as Proportional, Integral, Derivative or "PID" settings), and loop type (such as flow, pressure, level, or temperature), time localization of an oscillating signal may be very useful in identifying stiction.

As shown in FIG. 9, a method 900 for characterizing the oscillations in a signal involves three basic steps. The first step 902 removes a non-constant mean from the signal being analyzed (such as signal 112 or 116). In some embodiments, this may involve the use of an adaptive mean-shifting procedure. In particular embodiments, the mean-shifting procedure may involve finding local maxima and minima points in the signal being analyzed. Once the extreme points are identified, a cubic spline as an upper envelope can connect all of the local maxima, and a lower envelope can be produced from the local minima. The mean of the data can be computed by averaging the upper and lower envelopes. The shifted signal may be obtained by subtracting the calculated mean from the actual signal.

The second step 904 involves computing the area of the mean shifted signal and normalizing the area. This step may help to reduce or remove spurious zero-crossings that occur due to noise.

The third step 906 involves finding points at which slope changes occur in the area curve, which helps to identify the zero-crossings of the signal being analyzed. In some embodiments, a clustering technique can be employed for highly noisy data to group nearby zero-crossing points. An auto-correlation function test can further confirm the presence of oscillation between the identified zero-crossings. Quiet periods (such as time periods where oscillations are not present) in an intermittently oscillating signal can be identified using a qualitative trend approach. In addition, a time vector at which zero-crossings occur in the signal being analyzed can be generated.

This method 900 can be completely automated as it involves parameters that are calculated from the signal being analyzed. This method 900 can also operate on univariate data series. As described below, this method 900 can be used when analyzing the signals 112-116 to determine a qualitative stiction severity measure.

Figure 10A:
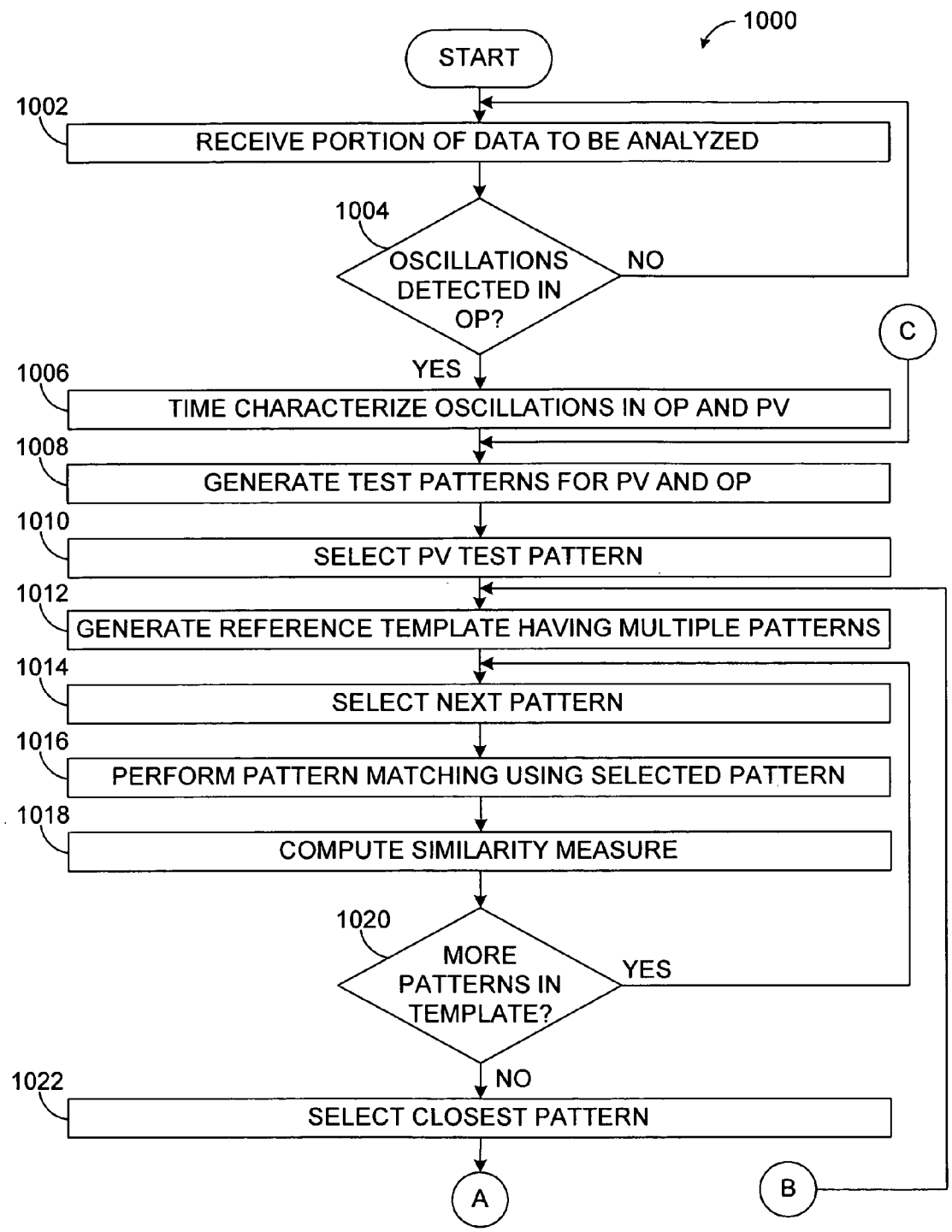
Figure 10B:
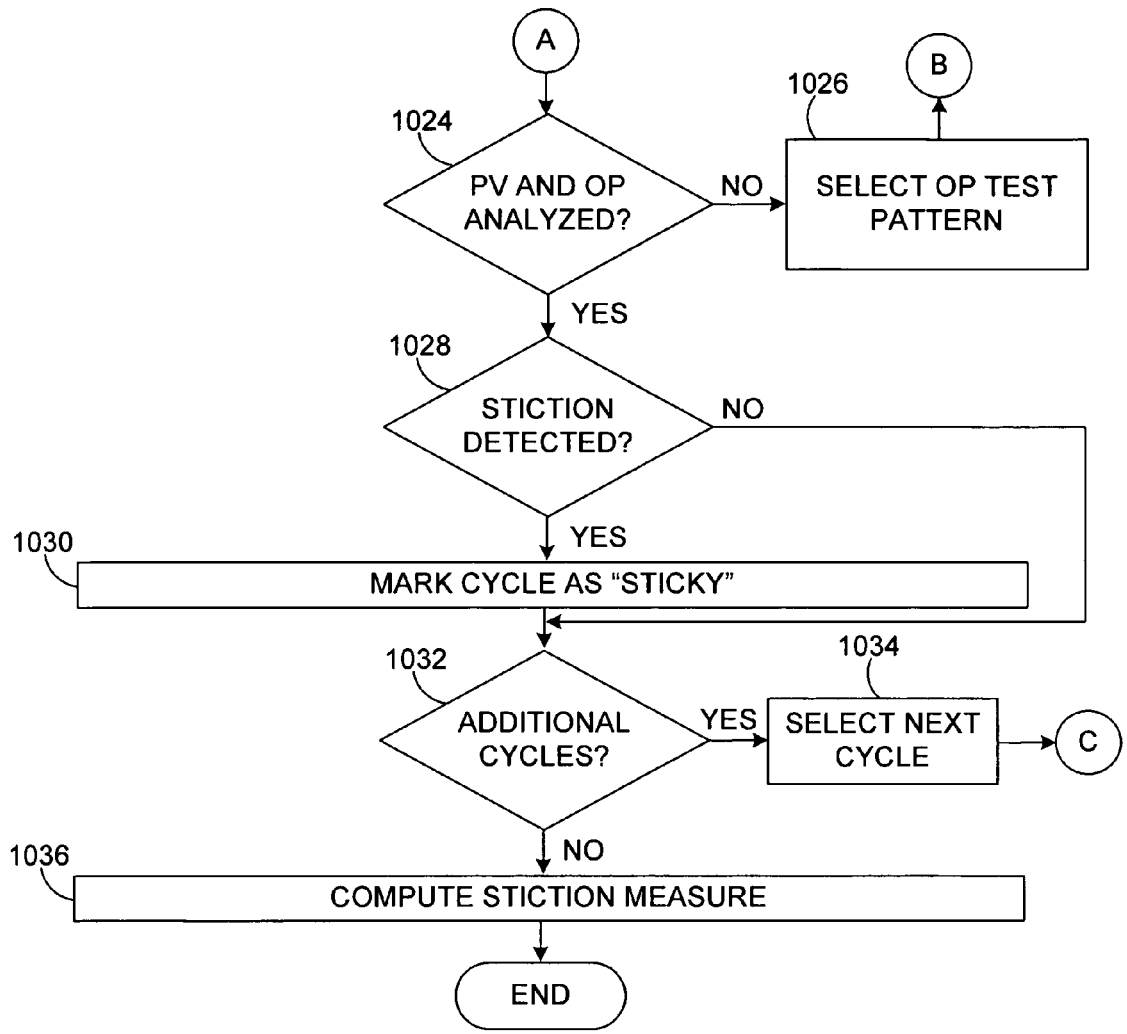

A method 1000 for qualitatively determining an amount of stiction in a valve 102 is shown in FIGS. 10A and 10B. In general, the method 1000 operates using sampled data (such as samples of signals 112-116). It is assumed that the sampling interval for data collection is adequate to preserve any relevant oscillating patterns. Typical sampling intervals for flow, pressure, level, and temperature loops can be one, five, thirty, and sixty seconds, respectively.

A portion of the data to be analyzed is received at step 1002. This may include receiving data samples of the process variable signal 112, the setpoint signal 114, and the output signal 116. At least some of this data can be mean-shifted as described above with respect to step 902 of FIG. 9.

The presence of oscillations is determined at step 1004. The oscillations could be detected, for example, using an auto-correlation test. If no oscillations are detected, the method 1000 returns to step 1002 to analyze additional data. Otherwise, the method 1000 continues to step 1006, where the oscillations in the process variable signal 112 (PV) and the output signal 116 (OP) are time characterized. This could occur as described above with respect to steps 904-906 of FIG. 9. In some embodiments, a threshold number of oscillation cycles are identified for analysis if possible, such as at least ten cycles. In particular embodiments, since the signals 112 and 116 oscillate in a similar time range, the time stamps for the zero-crossings of one (such as signal 116) can be used as the time stamps for the zero-crossings of the other (such as signal 112).

Using the input data and the time characterizations, test patterns for the process variable signal 112 and the output signal 116 are generated at step 1008. This could include, for example, selecting a portion of each signal 112 and 116 that contains a single full cycle of the oscillations (based on the identified zero-crossings). This could also include identifying the peak positive and negative amplitudes and their corresponding time periods.

The process variable signal's test pattern is selected at step 1010. At step 1012, a reference template is generated for the selected test pattern. The reference template may include multiple patterns, such as square/rectangular, triangular, trapezoidal, and sinusoidal patterns. The patterns may have the appropriate amplitude and frequency for the selected test pattern, which could be determined based on the identified peak amplitudes and corresponding time periods.

A first template pattern is selected at step 1014. A pattern matching is performed using the selected test pattern and the selected template pattern at step 1016. This could include using Dynamic Time Warping to perform the pattern matching. A similarity measure (or a dissimilarity measure) of the two patterns is determined and stored at step 1018. If more template patterns remain to be processed at step 1020, the method 1000 returns to step 1014. Otherwise, the pattern from the template that most closely matches the selected test pattern is selected at step 1022. This could include identifying the template pattern having the highest similarity measure or the lowest dissimilarity measure.

At this point, a determination is made as to whether both the process variable signal's test pattern and the output signal's test pattern have been analyzed at step 1024. If not, the output signal's test pattern is selected at step 1026. The output signal's test pattern could have the same time range as the process variable signal's test pattern. The method 1000 then returns to step 1012, where the method 1000 identifies a pattern in a reference template that most closely matches the output signal's test pattern.

After both test patterns have been analyzed, a determination is made as to whether stiction is detected at step 1028. For example, if none of the template patterns closely matches the test pattern for either signal 112 or 116, this could result in a "no stiction" determination. If each test pattern closely matches one of its corresponding template patterns, the following table can be used to determine if stiction is present.

patterns match the patterns specified in Table 1, the stiction controller 122 may conclude that stiction is present in the valve 102. If (for a specified type of loop) one or more of the identified template shapes for the PV and OP test patterns do not match the patterns specified in Table 1, the stiction controller 122 may conclude that stiction is not present in the valve 102. For example, if a temperature loop has an OP test pattern that is smooth triangular in shape and a PV test pattern that is sinusoidal in shape, this may indicate stiction is present in the valve 102. If the temperature loop has an OP test pattern that is smooth triangular in shape and a PV test pattern that is square in shape, this may indicate stiction is not present in the valve 102.

If stiction is identified at step 1028, this particular oscillation cycle is marked as being "sticky" (meaning the oscillation cycle is indicative of stiction in the valve 102) at step 1030. If stiction is not identified at step 1028, this particular oscillation cycle is not marked as being "sticky." This process may be repeated for each individual oscillation cycle identified in the signals being analyzed, such as for each of at least ten oscillation cycles. If additional oscillation cycles remain to be processed at step 1032, the next oscillation cycle is selected at step 1034, and the process returns to step 1008 to analyze the next oscillation cycle.

If all of the oscillation cycles have been analyzed, a measure of stiction is determined at step 1036. For example, the stiction measure could be defined as the ratio of the number of cycles identified as being "sticky" versus the total number of cycles analyzed.

Although FIGS. 9 through 10B illustrate one example of a technique for qualitatively determining an amount of stiction in a valve 102, various changes may be made to FIGS. 9 through 10B. For example, while shown as a series of steps, some steps shown in the figures could overlap or occur in parallel. As a particular example, steps 1008-1010 could occur in parallel with steps 1012-1014.

FIGS. 11A and 11B illustrate an example technique for quantitatively determining an amount of stiction in a valve 102. This may be useful, for example, during step 502 of FIG. 5. As noted above, to determine a quantitative stiction severity measure, a Hammerstein model identification procedure can be used to estimate the stiction parameter d in Equation (1). In general, the method 1100 operates using sampled data (such as samples of signals 112-116). Here, the stiction identification task may involve estimating the best process model (where not available) and the stiction band d simultaneously, such that the operating data is modeled adequately.

As shown in FIG. 11A, a portion of the data to be analyzed is received at step 1102. This may include receiving data

TABLE 1

| Signal | Fast Process (Flow) | | Slow Process | Integrating | |
|---|---|---|---|---|---|
| | Dominant (I) Action | Dominant (P) Action | (Temperature, Pressure) | Process (Level) | Level With PI Control |
| OP | Triangular (Sharp) | Rectangular | Triangular (Smooth) | Triangular (Sharp) | Triangular (Sharp) |
| PV | Square | Rectangular | Sinusoidal | Triangular (Sharp) | Parabolic/ Trapezoidal |

Here, the top row identifies the different types of control or process loops (flow, temperature, pressure, integrating or level, and level with PI control). If (for a specified type of loop) the identified template shapes for the PV and OP test samples of the process variable signal 112, the setpoint signal 114, and the output signal 116. At least some of this data can be denoised, such as by using a wavelet denoising technique. The data can also be normalized.

The presence of oscillations is determined at step 1104. The oscillations could be detected, for example, using an auto-correlation test. If no oscillations are detected, the method 1100 returns to step 1102 to analyze additional data.

Otherwise, the method 1100 continues to step 1106, where a grid is generated for the stiction band d. If the process variable signal 112 and output signal 116 are normalized, the stiction band d may generally lie in the range 0-1 or 0%-100%. In particular embodiments, a one-dimensional grid (with a range of 0-1) is generated for the stiction band d, with values separated by any suitable interval (such as 0.1). A value of d is then selected from the grid at step 1108.

A model is then selected for use with the selected value of d. A decision is made as to whether a linear model of the process system is available at step 1110. The linear model could, for example, represent a process model (such as plant 406). If a linear model is available, the linear model is selected at step 1112.

Otherwise, an Auto-Regressive Moving Average with exogenous variable (ARMAX) model is identified and analyzed at step 1114. In particular embodiments, the ARMAX model can be defined as follows:

$$y(t) = \frac{B(q^{-1})}{A(q^{-1})}x(t-1) + \frac{C(q^{-1})}{A(q^{-1})}e(t) \quad (15)$$

where polynomials $A(q^{-1})$, $B(q^{-1})$, and $C(q^{-1})$ can be defined as:

$$A(q^{-1}) = 1 - a_1 q^{-1} - a_2 q^{-2} - \ldots - a_n q^{-n} \quad (16)$$

$$B(q^{-1}) = 1 + b_1 q^{-1} + b_2 q^{-2} + \ldots + b_m q^{-m} \quad (17)$$

$$C(q^{-1}) = 1 + c_1 q^{-1} + c_2 q^{-2} + \ldots + c_p q^{-p} \quad (18)$$

and $C(q^{-1})/A(q^{-1})$ represents model disturbances. The model can be analyzed in any suitable manner, such as by using a loss function based on the Akaike information criterion (AIC).

Via steps 1116-1118, the ARMAX model (with different model orders) is analyzed, and the loss function can be determined for each model order. The ARMAX model having the lowest AIC value is then selected at step 1120.

The selected model and the selected value of d are applied to the data being analyzed at step 1122. This may include applying the selected model and the selected value of d to the process variable signal 112 in order to predict the output signal 116. The predicted output signal 116 is then compared to the actual output signal 116 to determine a mean square error at step 1124. If any grid points remain to be processed at step 1126, the process returns to step 1108 to select and analyze another grid point.

Otherwise, all grid points have been analyzed, and the grid point with the lowest mean square error is selected at step 1128. This grid point may represent the best estimate the stiction parameter d in Equation (1). An amount of stiction based on the selected grid point is then reported at step 1130.

Although FIGS. 11A and 11B illustrate one example of a technique for quantitatively determining an amount of stiction in a valve 102, various changes may be made to FIGS. 11A and 11B. For example, while shown as a series of steps, some steps shown in the figures could overlap or occur in parallel. Also, while a grid search has been illustrated in the figures, other algorithms may be applied to find the optimum or selected stiction band d.

In addition, fixing the stiction band d grid size (such as to values of 0-1) and the band's interval or resolution may impact stiction diagnosis. For example, after a certain value of the stiction band d, the mean square error may change marginally, which is explained using the stiction model in Equation (1). When the loop is oscillating, it can be seen that, for any increase in the stiction band d beyond a value that is more than the actual stiction band, the position of the stem 202/plug 204 remains unchanged as it retains its previous value. Since the input remains unchanged above a certain value from the true value of d, the identified linear model remains the same. This can be used to reduce the grid search space considerably, thereby improving the computational efficiency. The resolution of the grid can also be fixed based on hardware considerations of the control system. As an example, the controller output resolution may be limited by a digital-to-analog (D/A) output converter, which is often part of a distributed control system (DCS). The resolution of the grid for the stiction band d can thus be set to the D/A resolution of the DCS system.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit" and "receive," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:
   at least one memory operable to store operating data associated with a valve; and
   at least one processor operable to:
      identify whether the valve is suffering from stiction using at least part of the operating data; and
      adjust a control signal produced by a controller for the valve in order to at least partially compensate for the stiction suffered by the valve;
   wherein the at least one processor is operable to adjust the control signal by (i) adjusting the control signal to cause the valve to move into a steady-state position and (ii) adjusting the control signal to cause the valve to remain in the steady-state position;
   wherein the at least one processor is operable to adjust the control signal to cause the valve to move into the steady-state position by (i) generating one or more first compensating signals for adjusting the control signal to cause the valve to move from a starting position into one or more new positions, (ii) predicting a next value of the control signal using a model of the controller, and (iii) generating, based on the predicted next value of the control signal, a second compensating signal for adjusting the control signal to cause the valve to move from a last of the one or more new positions into the steady-state position;
   wherein the at least one processor is operable to identify whether the valve is suffering from stiction by (i) determining a qualitative stiction severity measure by performing qualitative pattern recognition and (ii) determining a quantitative stiction severity measure by performing a model identification procedure; and
   wherein the at least one processor is operable to determine the qualitative stiction severity measure by:
      removing a non-constant mean from the at least part of the operating data to produce a mean-shifted signal;
      computing an area associated with the mean-shifted signal and normalizing the area to produce an area curve; and
      finding one or more points at which slope changes occur in the area curve to identify one or more zero-crossings.

2. The apparatus of claim 1, wherein the at least one processor is operable to generate one first compensating signal as defined by:

$$(f_k)_t = |m_t| + d$$

where $(f_k)_t$ represents the first compensating signal at time t, $m_t$ represents a value of the control signal at time t, and d represents a value of a stiction band in a stiction model.

3. The apparatus of claim 2, wherein the first compensating signal is added to or subtracted from the control signal.

4. The apparatus of claim 2, wherein the at least one processor is operable to generate the second compensating signal as defined by:

$$(f_k)_{t+1} = -m_{t+1}$$

where $(f_k)_{t+1}$ represents the second compensating signal at time t+1, and $m_{t+1}$ represents the predicted next value of the control signal at time t+1.

5. The apparatus of claim 1, wherein the at least one processor is operable to adjust the control signal to cause the valve to remain in the steady-state position by generating a third compensating signal that satisfies a condition:

$$|m_t + (f_k)_t| < d$$

where $(f_k)_t$ represents the third compensating signal at time t, $m_t$ represents a value of the control signal at time t, and d represents a value of a stiction band in a stiction model.

6. The apparatus of claim 1, wherein the at least one processor is operable to adjust the control signal to cause the valve to remain in the steady-state position until a change in a setpoint occurs, the setpoint associated with the steady-state position of the valve.

7. A method, comprising:
   identifying whether a valve is suffering from stiction; and
   adjusting a control signal produced by a controller for the valve in order to at least partially compensate for the stiction suffered by the valve;
   wherein adjusting the control signal comprises (i) adjusting the control signal to cause the valve to move into a steady-state position and (ii) adjusting the control signal to cause the valve to remain in the steady-state position;
   wherein adjusting the control signal to cause the valve to move into the steady-state position comprises (i) generating one or more first compensating signals for adjusting the control signal to cause the valve to move from a starting position into one or more new positions, (ii) predicting a next value of the control signal using a model of the controller, and (iii) generating, based on the predicted next value of the control signal, a second compensating signal for adjusting the control signal to cause the valve to move from a last of the one or more new positions into the steady-state position;
   wherein identifying whether the valve is suffering from stiction comprises (i) determining a qualitative stiction severity measure by performing qualitative pattern recognition and (ii) determining a quantitative stiction severity measure by performing a model identification procedure; and
   wherein determining the qualitative stiction severity measure comprises:
      detecting multiple oscillations in the at least part of the operating data;
      time-characterizing the detected oscillations;
      for each time-characterized oscillation, generating a test pattern associated with the oscillation, generating a reference template comprising multiple patterns, and determining that the oscillation represents a "sticky" oscillation if the test pattern matches a specified one of the patterns in the reference template; and
      determining a measure of stiction based on a number of "sticky" oscillations.

8. The method of claim 7, wherein generating the one or more first compensating signals comprises generating one first compensating signal as defined by:

$$(f_k)_t = |m_t| + d$$

where $(f_k)_t$ represents the first compensating signal at time t, $m_t$ represents a value of the control signal at time t, and d represents a value of a stiction band in a stiction model.

9. The method of claim 8, wherein generating the second compensating signal comprises generating one second compensating signal as defined by:

$$(f_k)_{t+1} = -m_{t+1}$$

where $(f_k)_{t+1}$ represents the second compensating signal at time t+1, and $m_{t+1}$ represents the predicted next value of the control signal at time t+1.

10. The method of claim 7, wherein adjusting the control signal to cause the valve to remain in the steady-state position comprises generating a third compensating signal that satisfies a condition:

$$|m_t+(f_k)_t|<d$$

where $(f_k)_t$ represents the third compensating signal at time t, $m_t$ represents a value of the control signal at time t, and d represents a value of a stiction band in a stiction model.

11. The method of claim 7, wherein adjusting the control signal to cause the valve to remain in the steady-state position continues until a change in a setpoint occurs, the setpoint associated with the steady-state position of the valve.

12. The method of claim 7, wherein the controller is operable to use measurement data from a sensor to generate the control signal.

13. The method of claim 7, wherein identifying whether the valve is suffering from stiction comprises determining whether the valve is suffering from a threshold amount of stiction.

14. A computer readable medium embodying a computer program, the computer program comprising:
  computer readable program code for identifying whether a valve is suffering from stiction; and
  computer readable program code for adjusting a control signal produced by a controller for the valve in order to at least partially compensate for the stiction suffered by the valve;
  wherein the computer readable program code for adjusting the control signal comprises (i) computer readable program code for adjusting the control signal to cause the valve to move into a steady-state position and (ii) computer readable program code for adjusting the control signal to cause the valve to remain in the steady-state position;
  wherein the computer readable program code for adjusting the control signal to cause the valve to move into the steady-state position comprises (i) computer readable program code for generating one or more first compensating signals for adjusting the control signal to cause the valve to move from a starting position into one or more new positions, (ii) computer readable program code for predicting a next value of the control signal using a model of the controller, and (iii) computer readable program code for generating, based on the predicted next value of the control signal, a second compensating signal for adjusting the control signal to cause the valve to move from a last of the one or more new positions into the steady-state position;
  wherein the computer readable program code for identifying whether the valve is suffering from stiction comprises computer readable program code for (i) determining a qualitative stiction severity measure by performing qualitative pattern recognition and (ii) determining a quantitative stiction severity measure by performing a model identification procedure; and
  wherein the computer readable program code for determining the quantitative stiction severity measure comprises computer readable program code for:
    generating a grid comprising multiple values of a stiction band;
    for each value in the grid, selecting that value of the stiction band, selecting a model for use with that value of the stiction band, applying the selected value of the stiction band and the selected model to the at least part of the operating data, and determining an error associated with the application of the selected value of the stiction band and the selected model to the at least part of the operating data;
    identifying the lowest error; and
    determining a measure of stiction based on the selected value of the stiction band and the selected model that are associated with the lowest error.

15. The computer readable medium of claim 14, wherein the computer readable program code for generating the one or more first compensating signals comprises computer readable program code for generating one first compensating signal as defined by:

$$(f_k)_t=|m_t+d$$

where $(f_k)_t$ represents the first compensating signal at time t, $m_t$ represents a value of the control signal at time t, and d represents a value of a stiction band in a stiction model.

16. The computer readable medium of claim 15, wherein the computer readable program code for generating the second compensating signal comprises computer readable program code for generating one second compensating signal as defined by:

$$(f_k)_{t+1}=-m_{t+1}$$

where $(f_k)_{t+1}$ represents the second compensating signal at time t+1, and $m_{t+1}$ represents the predicted next value of the control signal at time t+1.

17. The computer readable medium of claim 14, wherein the computer readable program code for adjusting the control signal to cause the valve to remain in the steady-state position comprises computer readable program code for generating a third compensating signal that satisfies a condition:

$$|m_t+(f_k)_t|<d$$

where $(f_k)_t$ represents the third compensating signal at time t, $m_t$ represents a value of the control signal at time t, and d represents a value of a stiction band in a stiction model.

18. The apparatus of claim 1, wherein the at least one processor is operable to determine the qualitative stiction severity measure by:
  detecting multiple oscillations in the at least part of the operating data;
  time-characterizing the detected oscillations;
  for each time-characterized oscillation, generating a test pattern associated with the oscillation, generating a reference template comprising multiple patterns, and determining that the oscillation represents a "sticky" oscillation if the test pattern matches a specified one of the patterns in the reference template; and
  determining a measure of stiction based on a number of "sticky" oscillations.

19. The apparatus of claim 1, wherein the at least one processor is operable to determine the quantitative stiction severity measure by performing a Hammerstein model identification procedure to estimate a stiction parameter d in:

$$x_t = \begin{cases} x_{t-1} & \text{if } |u_t - x_{t-1}| \le d \\ u_t & \text{otherwise} \end{cases}$$

where $x_t$ and $x_{t-1}$ represent present and past movements associated with the valve and $\mu_t$ represents a present value of the control signal.

20. The apparatus of claim 1, wherein the at least one processor is operable to determine the quantitative stiction severity measure by:

generating a grid comprising multiple values of a stiction band;

for each value in the grid, selecting that value of the stiction band, selecting a model for use with that value of the stiction band, applying the selected value of the stiction band and the selected model to the at least part of the operating data, and determining an error associated with the application of the selected value of the stiction band and the selected model to the at least part of the operating data;

identifying the lowest error; and determining a measure of stiction based on the selected value of the stiction band and the selected model that are associated with the lowest error.

21. The apparatus of claim 1, wherein:

the at least one processor is operable to generate the one or more first compensating signals by selecting any first compensation that causes the valve to move from a stuck position without saturating; and the at least one processor is operable to generate the second compensating signal by selecting a second compensation that is not dependent on the first compensation.

* * * * *